(12) United States Patent
Fritze et al.

(10) Patent No.: US 10,515,299 B2
(45) Date of Patent: Dec. 24, 2019

(54) DOCUMENT WITH SENSOR MEANS

(71) Applicant: Bundesdruckerei GmbH, Berlin (DE)

(72) Inventors: Frank Fritze, Berlin (DE); Joerg Fischer, Berlin (DE); Jakob Hille, Berlin (DE)

(73) Assignee: BUNDESDRUCKEREI GMBH, Berlin (DE)

( * ) Notice: Subject to any disclaimer, the term of this patent is extended or adjusted under 35 U.S.C. 154(b) by 0 days.

(21) Appl. No.: 15/327,781

(22) PCT Filed: Jul. 21, 2015

(86) PCT No.: PCT/EP2015/066632
§ 371 (c)(1),
(2) Date: Jan. 20, 2017

(87) PCT Pub. No.: WO2016/016046
PCT Pub. Date: Feb. 4, 2016

(65) Prior Publication Data
US 2017/0213122 A1    Jul. 27, 2017

(30) Foreign Application Priority Data

Jul. 29, 2014 (DE) .................. 10 2014 110 694

(51) Int. Cl.
G06K 19/06 (2006.01)
G06K 7/08 (2006.01)
G06K 19/077 (2006.01)

(52) U.S. Cl.
CPC ....... G06K 19/0775 (2013.01); G06K 19/077 (2013.01)

(58) Field of Classification Search
USPC .................. 235/375, 382, 451, 492, 380
See application file for complete search history.

(56) References Cited

U.S. PATENT DOCUMENTS

2002/0153424 A1* 10/2002 Li .................. G06K 19/06206
235/492
2005/0207624 A1* 9/2005 Ehlers ............... G06K 9/00013
382/124
(Continued)

FOREIGN PATENT DOCUMENTS

CN      1695163 A    11/2005
CN    102831685 A    12/2012
(Continued)

OTHER PUBLICATIONS

International Search Report PCT/ISA/210 for International Application No. PCT/EP2015/066632 dated Oct. 12, 2015.
(Continued)

*Primary Examiner* — Tuyen K Vo
(74) *Attorney, Agent, or Firm* — Harness, Dickey & Pierce, P.L.C.

(57) ABSTRACT

A document includes a sensor, at least one antenna, a first processor, a second processor, storage, and a switch. The first processor is configured to communicate with an external reading device via the antenna. The switch is configured to switch the antenna between a first stable state in which a communication is prevented between the first processor and the reading device, and a second stable state, in which a communication is possible between the first processor and the reading device. The sensor is configured to detect a first identification feature of a user of the document. The second processor is configured to compare the first identification feature with a second identification feature saved in the storage, wherein the second processor is configured to switch the switch to a second state if there is conformity between the first identification feature and the second identification feature.

16 Claims, 4 Drawing Sheets

(56) References Cited

U.S. PATENT DOCUMENTS

| | | | |
|---|---|---|---|
| 2006/0113381 A1 | 6/2006 | Hochstein et al. | |
| 2007/0220273 A1* | 9/2007 | Campisi | G06K 9/00006 713/186 |
| 2008/0223925 A1* | 9/2008 | Saito | G06Q 20/341 235/380 |
| 2009/0066478 A1* | 3/2009 | Colella | G06Q 10/06 340/5.83 |
| 2009/0069051 A1* | 3/2009 | Jain | G06K 19/07739 455/558 |
| 2011/0231905 A1 | 9/2011 | Breuer | |
| 2012/0200389 A1* | 8/2012 | Solomon | G06Q 10/087 340/5.52 |
| 2013/0201000 A1* | 8/2013 | Solomon | G05B 1/01 340/5.83 |
| 2013/0207786 A1* | 8/2013 | Hutzler | G06K 9/00892 340/10.51 |
| 2013/0232082 A1* | 9/2013 | Krawczewicz | G06F 19/324 705/55 |
| 2014/0210589 A1* | 7/2014 | Grace | G06F 21/34 340/5.51 |

FOREIGN PATENT DOCUMENTS

| | | | |
|---|---|---|---|
| CN | 204831175 U | 12/2015 | |
| CN | 205390305 U | 7/2016 | |
| CN | 105815810 A | 8/2016 | |
| DE | 102006027253 A1 | 12/2007 | |
| EP | 0849703 A2 | 6/1998 | |
| WO | WO2008010899 A2 * | 1/2008 | H04L 9/32 |
| WO | WO-2008010899 A2 | 1/2008 | |
| WO | WO-2010037361 A1 | 4/2010 | |

OTHER PUBLICATIONS

Written Opinion of the International Searching Authority PCT/ISA/237 for International Application No. PCT/EP2015/066632 dated Oct. 12, 2015.
International Preliminary Report on Patentability for International Application No. PCT/EP2015/086632 dated Feb. 9, 2017.
European Office Action dated Feb. 8, 2019 issued in corresponding European Application No. 15741167.9 (no translation provided).
Chinese Office Action dated Dec. 26, 2018 issued in corresponding Chinese Application No. 201500397593 (with translation).

* cited by examiner

DOCUMENT WITH SENSOR MEANS

CROSS-REFERENCE TO RELATED APPLICATIONS

This application is a national phase under 35 U.S.C. § 371 of PCT International Application No. PCT/EP2015/066632 which has an International filing date of Jul. 21, 2015, which claims priority to German Application No. 102014110694.6, filed Jul. 29, 2014, the entire contents of each of which are hereby incorporated by reference.

The invention relates to a document with sensor means, at least one antenna, two processors working separately from one another, storage means, and a switch, and further relates to a method for initializing such a document and to an access control system that comprises such a document and a reading device and an access control device.

A number of documents for identifying or authenticating a document holder are known in the prior art. Prominent examples of this are, for instance, identification cards, and passports, but also access cards that are intended to permit a certain person access to a secure area, for instance. In the prior art, however, especially with the example of the access cards, there is the problem that an access card may not necessarily able to be used solely by the person for whom the access card is provided. Thus, for example, any unknown person may use a found access card to obtain access to a restricted area.

One possible solution for this is comprised, for instance, in using an additional authentication process in which a certain security attribute, for instance a PIN, is requested from the card user. Alternatively or in addition, identification of the card user may also be provided, wherein after the card user has been identified there is a check to determine whether this is the authorized card holder.

Biometric methods and technologies for identifying and authenticating a card user are known in the prior art. For instance, fingerprint sensors are well suited for secure identification processes and are already used around the world.

The underlying object of the invention is to prevent the problem, described in the foregoing, of wrongful use of a document.

This object is attained with the features of each of the independent patent claims. Embodiments of the invention are provided in the dependent patent claims. Provided nothing to the contrary is expressly stated, embodiments of the invention may be freely combined with one another.

In this case, a "document" shall especially be construed to mean a portable electronic device that has at least one data storage element for storing an attribute and a communication interface for reading out the attribute. The document preferably has a secured memory for storing the at least one attribute to prevent the attribute stored in the memory from being altered in an impermissible manner and from being read out without the authorization required for this.

Furthermore, "document" shall be construed to mean a valuable or security document, especially a high security document, that may be paper and/or plastic-based, such as, for instance, identification documents, especially passports, identity cards, visas, and drivers licenses, vehicle registration documents, employee IDs, health insurance cards, and other identification documents like smart cards, means of payment, bank cards and credit cards, bills of lading, and other credentials. Depending on embodiment, a data storage element for storing the at least one attribute may be integrated in these.

In one aspect, the invention relates to a document that comprises sensor means, at least one antenna, a first processor, a second processor, storage means, and a switch. The first processor is designed to communicate with an external reading device via the antenna.

According to the invention, the switch is designed to switch the antenna between a first stable state, in which communication between first processor and external reading device is prevented, and a second instable state, in which communication between first processor and external reading device is possible. The first state of the switch is its base state. If the switch is not actuated, it automatically goes into its base state. Such a switch may be realized both using a corresponding electronic circuit and using a logical circuit having appropriate programming.

The sensor means of the inventive document are designed to detect a first identification feature of a user of the document. The second processor is designed to compare the detected first identification feature to a second identification feature that is stored in the storage means. When there is conformity between the first identification feature and the second identification feature, the second processor is furthermore designed to switch the switch to the second state so that communication between the first processor and the external reading device using the antenna is possible.

Embodiments of the invention could have the advantage that communication between the first processor and an external reading device is possible solely when a user has identified himself by a sensor detecting an identification feature using the document. If there has not been any successful identification of a document user, communication between the first processor and the external reading device is effectively prevented, since no active communication interface for the first processor is present. The communication interface, in this case the antenna, may be activated solely by a successful authentication of the document user.

To prevent communication between the first processor and a reading device, the antenna may be short-circuited by the switch in its first state, for instance, or completely decoupled from the first processor.

It is furthermore provided in the inventive document that both the detection of the identification feature and the checking of the identification feature is conducted on one and the same document (match-on-card). Since communication between the document and an external reading device is barred up to the point in time at which the comparison between the detected identification feature and the stored identification feature has concluded, there is no possibility of influencing the identification process, for instance in that a successful identification of the document user is simulated to the second processor or the switch.

The embodiment of the invention described in the foregoing is especially of interest for use in high security cards, since such a security card, which is designed, for instance, as an access card, may be converted to an inventive document with simple means. Thus it is merely necessary to provide the antenna present in a high security document with a switch and the inventive identification interface. This becomes possible due to the fact that the entire identity check of the document user does not run on the first processor, which is, for instance, part of a cryptographic access control method, but rather runs on a separate second processor.

It should be noted that the first and second processors are two processors that work separately from one another. However, both the first and the second processor may include a plurality of processor cores. However, no direct communication takes place between the first processor and the second processor.

The switch, which does not release the antenna until the identification feature of the user of the document has been successfully checked, may be an electric switch such as a Reed relay or an electrical relay, or may preferably be an electronic switch, such as, for instance, a transistor, a bipolar transistor, or a field effect transistor.

The reading device may in general be a terminal that accesses the first processor via a wireless or wired interface. The access is not limited solely to a read process, but may also include a write process.

The antenna of the document here represents both an interface for contactless communication and an interface for contacted communication.

According to embodiments of the invention, the identification feature may be a biometric feature of the user. According to one preferred embodiment, the biometric feature may be the fingerprint of the user. Other possible biometric features that may be used in the context of the invention described here are iris scans, voice comparisons, and the like. Furthermore, the identification feature may also be a password, such as, for instance, a numerical code.

Embodiments of the invention could have the advantage that, in particular when the fingerprint is used as identification feature, fingerprint scanners that are well known in the prior art and may be produced to be very compact may be used as sensor means. The use of a fingerprint sensor simplifies the handling of the inventive document, since during an authentication process the user normally holds the document in his hands. Thus an identity check of the document user may occur when the user takes the document into his hand.

According to one embodiment of the invention, the second processor is designed to keep the switch in the second state as long as the identification feature is detected if the first identification feature and the second identification feature match. That is, in this embodiment there is continuous detection of an identification feature.

Embodiments of the invention could have the advantage that, in particular with the use of a fingerprint as identification feature, the document remains usable only as long as it is held in the hands of the user for whom the document is provided. Thus misuse of the document by an unauthorized user is rendered significantly more difficult, since access to the first processor of the document is prohibited as soon as the authorized user no longer holds the document in his hand.

According to an alternative embodiment, the second processor is designed to keep the switch in the second state for a pre-defined period of time after it has been determined that the first identification feature and the second identification feature match.

Embodiments of the invention could have the advantage that, once the document user has been identified, the document does not necessarily have to be held by the user in his hands, so that the document user may, for instance, place the document to the side once a computer terminal has been unlocked and has both hands free for working on the computer terminal. The period of time for which the antenna of the document is kept in the second state may be adjusted such that, for instance, work may be performed on a computer terminal, but misuse of the document due to a usage period that is too long is prevented.

According to one embodiment of the invention, the document furthermore comprises a battery, wherein the battery is designed to supply the second process and the sensor means with energy. The battery may be, for example, a rechargeable battery, for instance a film battery.

Embodiments of the invention could have the advantage that the second processor and the sensor means are also supplied with energy when the antenna of the document is in the first state in which coupling energy in from an external device is not possible.

According to another embodiment, the document may furthermore comprise a contact interface, wherein the contact interface is designed to supply the second processor and the sensor means with energy. It should be noted that the use of a battery and the use of a contact interface are not mutually exclusive.

Embodiments could have the advantage that the document is supplied with energy by the contact interface precisely when the document is being held at a correspondingly configured reading device, for instance. In this case, it would be possible to do without a battery so that the document may be configured more compactly overall. Furthermore, the contact interface may also be used for recharging a battery present in the document during the contact with a reading device.

According to another embodiment, the document comprises an actuation element, wherein the actuation element is designed when actuated to turn on the energy supply for the second processor and the sensor means. For instance, such an actuation element may be a push-button.

Embodiments of the invention could have the advantage, for instance, that when using a fingerprint as identification feature, the fingerprint scanner is not supplied with energy using a push-button and thus actuated until the user of the document presses his finger onto the document. Thus the service life of any battery employed may be extended, since the battery is only used when an identification process is also actually provided. Alternatively, the actuation element could also comprise a photosensitive cell so that the sensor means and the second processor are turned on at the moment in which the document is removed, for example, from an opaque wrapper, such as, for example, a protective container.

According to one embodiment of the invention, the document body of the document has at least one rendering of a visual identification feature of the user. For instance, it may be provided that a likeness is printed on the document body.

Embodiments of the invention could have the advantage that, in addition to checking the identification feature by means of the second processor and the sensor means, an identity check of the document user may also be conducted, for instance by security personnel, using the visual identification means that is reproduced on the document.

According to another embodiment of the invention, the document body of the document is constructed in multiple layers, wherein the layers comprise paper and/or plastic. Furthermore, according to one embodiment of the invention, a recess for receiving the sensor means is provided in the document body. Thus, for instance, a flexible and robust document may be prepared using the plastic, it being possible to embody the paper layers, for instance, such that the document may be signed with a signature by a user. The switch electronics, comprising the first processor, the second processor, the storage means, the antenna, and conductors may be laminated between the layers of the document body. Furthermore, using the recess the document body, the sensor means may be received in the document in a positive fit to improve the haptics of the document.

According to another embodiment of the invention, the antenna is designed to convert electromagnetic radiation received by the reading device into electrical energy, wherein the antenna is furthermore designed to supply the first processor with electrical energy when the switch is in the second state.

This could have the advantage that the first processor may be actuated solely if the antenna has been switched to the second state, and, specifically, regardless of whether the first processor is to be accessed via the antenna or other interfaces. Since the antenna is only switched to the second state if the user of the document has clearly been detected using the identification feature, it is possible to effectively exclude misuse of the first processor.

According to another embodiment of the invention, the antenna is furthermore designed to charge with electrical energy, when the switch is in the second state, a battery that is designed to supply the second processor and the sensor means with energy.

According to another embodiment of the invention, the document contains a second storage means having a protected memory for storing at least one attribute, wherein the first processor transmits to the reading device via the antenna the at least one attribute solely after a successful check of a cryptographic access condition. The cryptographic access condition may be, for instance, a challenge-response process, requesting a PIN, or requesting an authorization certificate. However, the cryptographic access conditions in the context of the present invention are not limited to these options.

In another aspect, the invention relates to a method for initializing a document according to any of the foregoing claims with the following steps:

In a first step, the antenna of the document is switched to the second state. This may occur, for instance, after the document has been produced so that the document may be addressed by an external device when the document is in a delivery state.

In a second step, the first processor is configured by the reading device. To this end, the reading device may access the first processor via the antenna. As soon as the configuration of the first processor has concluded, the antenna is switched to the first state.

In a next step, an identification feature of the user of the document is detected by the sensor means. This detected identification feature is then stored in the storage means of the document as a second identification feature by the second processor.

According to another embodiment of the invention, the method for initialization, described in the foregoing, may also be embodied such that an identification feature of the user of the document may be detected by the sensor means in a first step. Then the detected identification feature is stored in the storage means by the second processor as a second identification feature.

After the second identification feature has been stored in the storage means, the sensor means detect a first identification feature of the user of the document. This first identification feature is then compared to the second identification feature by the second processor. If there is conformity between the first identification feature and the second identification feature, the switch is then switched to the second state by the second processor, and the first processor is configured by the reading device. Then the antenna is switched back to the first state.

The difference from the first method for initializing the document is thus comprised in that initially the document is registered to a user in that the user's identification features is stored and the antenna is not turned on until following a new check of the identity of the document user so that the first processor may be configured.

For instance, the first aforesaid method may be used if a great number of documents with the same functionality are to be produced. Once the documents have been manufactured and all of the first processors have been set up according to the desired functionality, each of the documents may be registered to a different user. In contrast, the second method for initialization may be used when the functionalities of a document are not to be established initially, but instead the document is only allocated to one user. The user may then decide for himself, for instance, which functionalities the document allocated to him should have. Thus individualization of the functionalities of the document would be possible. However, it is not fundamentally excluded that a document that was initialized according to the first aforesaid method is subsequently expanded or limited in functionalities.

In another aspect, the invention relates to an access control system that comprises at least one document as described in the foregoing and at least one reading device and one access control device. The reading device is designed to communicate with the document, wherein the document, following successful checking of a cryptographic access condition, transmits the at least one attribute to the reading device. The reading device is designed to compare the attribute received by the document to a reference attribute, wherein the reading device is furthermore designed to switch the access control device to a release state if the received attribute matches the reference attribute. For instance, the access control device may be a locking device for a door or may be a computer terminal.

Preferred embodiments of the invention are described in greater detail, using the drawings, in the following.

In the following, documents that are similar to one another use the same reference numbers.

Figure 1:
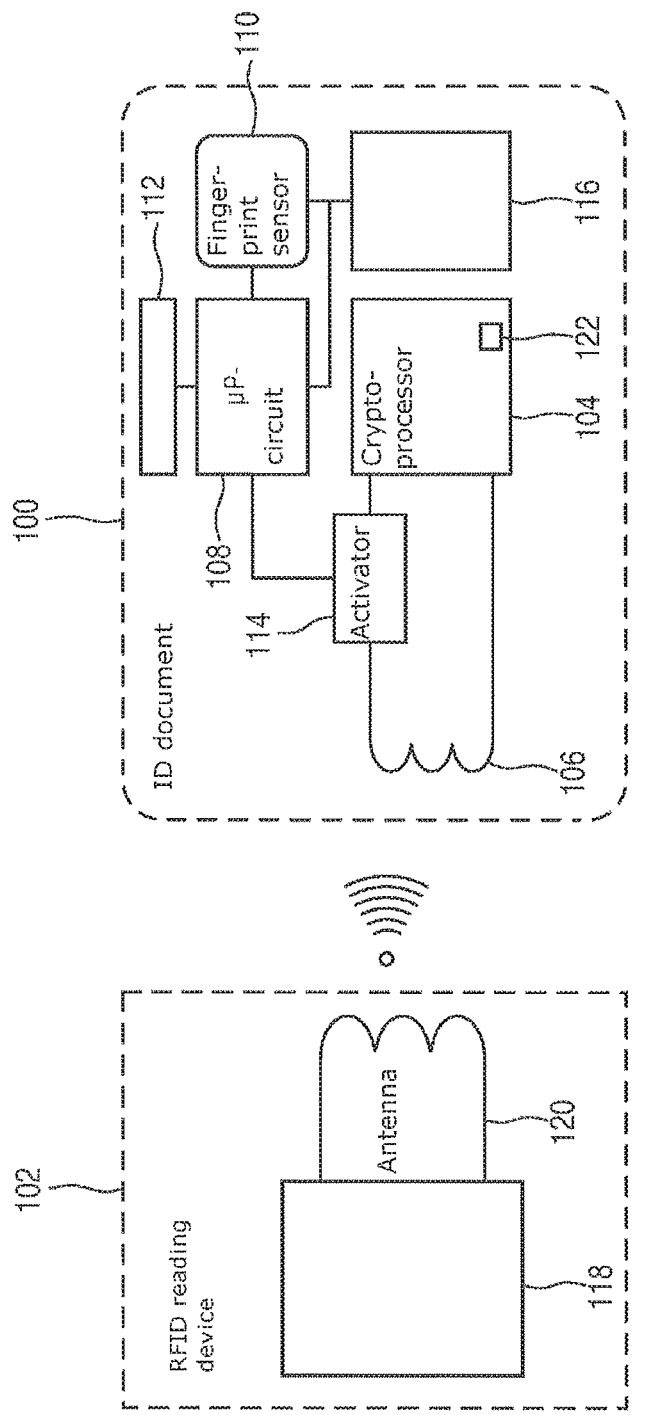
FIG. 1 is a block diagram of a first inventive document.

FIG. 1 is a block diagram of an inventive document 100 in combination with a reading device 102. The document 100 comprises a cryptoprocessor 104 that is designed for wireless communication with the reading device 102 by means of an antenna 106. For instance, the cryptoprocessor 104 may be a MIFARE transponder. The document 100 furthermore comprises a microprocessor circuit 108 that is connected to a fingerprint sensor 110, a storage means 112, and an actuator 114. The actuator 114 may be, for instance, an electrical switch such as a Reed relay, an electrical relay, or preferably an electronic switch, such as for instance a transistor, a bipolar transistor, or a field effect transistor.

The document 100 furthermore comprises an energy source 116 that is designed for supplying energy to the microprocessor circuit 108 and the fingerprint sensor 110. The energy source 116 may be, for instance, a battery or a device for energy harvesting. Piezoelectric crystals, thermoelectric generators, or the like may be used for this, for instance.

The reading device 102 comprises a cryptographic circuit 118 that is designed to communicate with the cryptoprocessor 104 of the document 100 by means of an antenna 120. The reading device 102 may be an RIFD reading device, for example. The communication between the reading device 102 and the document 100 may take place wirelessly, for instance, corresponding to the ISO 14443 standard at a frequency of 13.56 MHz.

The reading device 102 may be an access control system, for instance, wherein a user wants to switch an access control device to a release state by means of the document 100. To this end, stored in the cryptoprocessor 104 in a protected memory 122 is an attribute that is to be read out by the reading device 102 and compared to a reference attribute. The access control device is not switched to a release state unless the attribute readout of the protected memory 122 and the reference attribute stored in the reading device 102 match.

To prevent misuse of the document 100 by an unauthorized person, provided in the document 100, in addition to the security documents known in the prior art, are the actuator 114, the circuit 108, the fingerprint sensor 110, and the memory 112. When the document 100 is not in use, the actuator 114 is initially in a stable first state in which communication between the cryptoprocessor 104 and the cryptographic circuit 118 of a reading device 102 via the antenna 106 is prohibited. For example, the actuator 114 can short circuit the antenna 106 or completely decouple from the cryptoprocessor 104.

If a user wants, by means of the document 100, to switch the access control device to the release state by reading out the attribute 122 by means of the reading device 102, the user must first hold his finger against the fingerprint sensor 110 of the document 100. The fingerprint sensor 110 then detects the fingerprint of the user of the document 100 and transmits the fingerprint to the microprocessor circuit 108. The microprocessor circuit 108 then accesses the memory 112 in order to retrieve a reference fingerprint of the authorized user of the document 100. Then the microprocessor circuit 108 compares the fingerprint retrieved from the memory 112 to the fingerprint detected by the fingerprint sensor 110.

If the two fingerprints match one another, the microprocessor circuit 108 triggers the actuator 114 so that the actuator 114 switches the antenna 106 to the second state. Communication between the cryptoprocessor 104 and the cryptographic circuit 118 of the reading device 102 is possible in this second state. The reading device 102 may then execute a cryptographic authentication procedure with the document 100.

As was stated in the foregoing, the energy source 116 is provided for supplying energy to the microprocessor circuit 108 and the fingerprint sensor 110. To prevent a situation in which the energy source 116 must continuously supply the microprocessor circuit 108 and the fingerprint sensor 110 with energy, a switch may be provided, the actuation of which actuates supply of energy to the microprocessor circuit 108 and the fingerprint sensor 110. For instance, this may be a push-button that is integrated in the fingerprint sensor 110. In this case, the microprocessor circuit 108 and the fingerprint sensor 110 would be turned on when a user of the document 100 attempts to identify himself using the document 100 in that he presses his finger against the fingerprint sensor 110.

Figure 2:
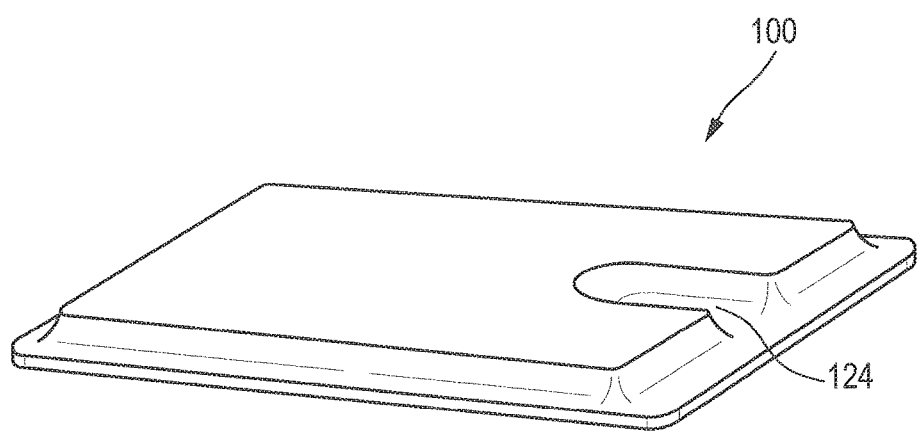
FIG. 2 is a sketch of an inventive document.

FIG. 2 is a schematic depiction of a document 100. The document body is constructed, for instance, in multiple layers using lamination, a recess 124 being provided in the document body. The fingerprint sensor 110 of the document 100 is embedded in the recess 124 to improve the haptics of the document 100. The document body of the document 100 may be designed, for instance, such that the outer dimensions of the document 100 comply with ISO 7810, having a thickness of 0.76 mm, wherein a center part of the document 100 may be designed thicker, however, in order to receive the electronics of the document 100. The document body may be produced from polycarbonate, for instance, and may be personalized with a personal visual feature of the user of the document 100 using a printing method, for instance. The document 100 may be printed with a likeness of the document user, for instance, by means of laser engraving or an injection process.

Figure 3:
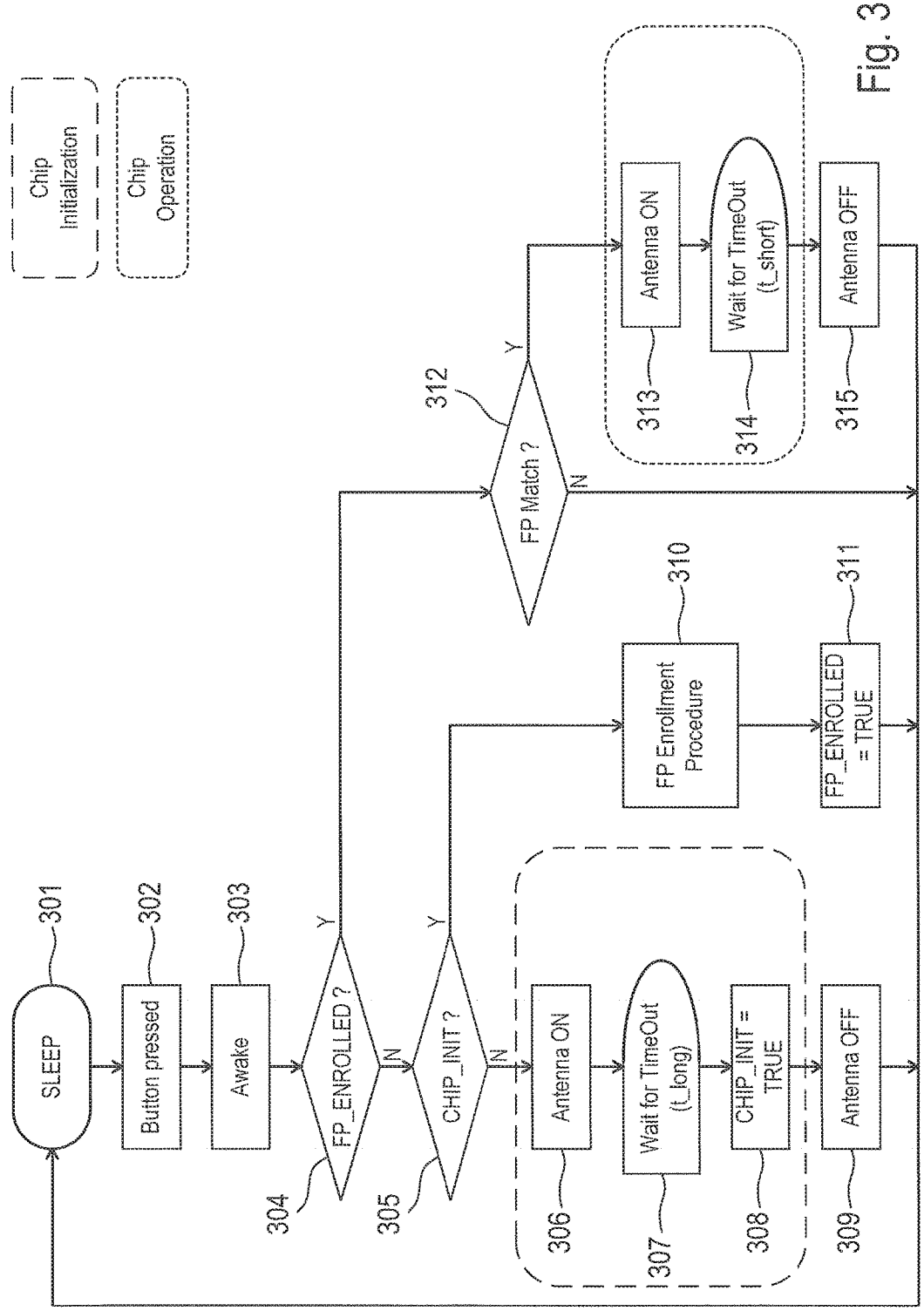
FIG. 3 is a flow chart for an initialization process of an inventive document; and, FIG. 4 is a flow chart for an alternative initialization process of an inventive document.

FIG. 3 is a flow chart of an initialization process for an inventive document 100. At first the document 100 is in a sleep state (SLEEP) 301. If the document 100 is now actuated 303, for instance by actuating a push-button 302, first the processor 108 checks whether the document 100 is already allocated to a user (FP_ENROLLED?) 304. If this is not the case, the processor 108 further checks whether the cryptoprocessor 104 has already been configured (CHIP_INIT?) 305. If this is also not the case, the processor 108 actuates the actuator 114 such that the latter switches to its instable second state so that communication between the cryptoprocessor 104 and an external reading device 102 is possible 306 via the antenna 106. This state is maintained for a predefined period of time (t_long) in which the cryptoprocessor 104 may be configured 307 by the reading device 102.

As soon as the predefined period of time has elapsed, the processor 108 sets a marker that the cryptoprocessor was configured (CHIP_INIT=TRUE) 308 and switches the actuator 114 to its first state so that communication between the cryptoprocessor 104 and the reading device 102 is prevented in that the antenna is turned off 309. The document 100 then returns to its sleep mode via 301. If the document 100 is actuated again 302, 303, the processor 108 again checks whether a user of the document 100 is already established 304. If this is not the case, there is then a check of whether the cryptoprocessor 104 has already been configured 305.

If it is then determined that the cryptoprocessor 104 was already configured, a registration procedure (FP Enrollment Procedure) is then initiated 310. To this end, the microprocessor 108 actuates the fingerprint sensor 110 in order to read in the fingerprint of a user of the document 100. The fingerprint of the user of the document 100 determined in this manner is then stored by the microprocessor 108 in the storage means 112 as a reference fingerprint. Then the microprocessor circuit 108 sets a marker that the document 100 was already registered to a user (FP_ENROLLED=TRUE) 311. The document 100 then returns to the sleep mode via 301.

If the document 100 is actuated again 302, 303, first there is another check of whether the document 100 is registered 304 to a user. If this is the case, the microprocessor 108 checks whether the fingerprint of a user of the document 100 detected by the fingerprint sensor 110 matches the reference fingerprint that is stored 312 in the storage means 112. If this is the case, the microprocessor circuit triggers the actuator 114 such that it goes into its second state and actuates 313 the antenna 106 so that the cryptoprocessor 104 can communicate with a reading device 102 via the antenna 106. It may be provided that the actuator 114 remains in this second state 314 for a brief predefined period of time (t_short) and then returns to its stable first state. This turns the antenna 106 off 315.

However, if it was previously determined that the fingerprint detected via the fingerprint sensor 110 does not match the fingerprint that is stored in the storage means 112, the microprocessor circuit 108 discontinues the method at this point and returns the document to the sleep mode 301.

Figure 4:
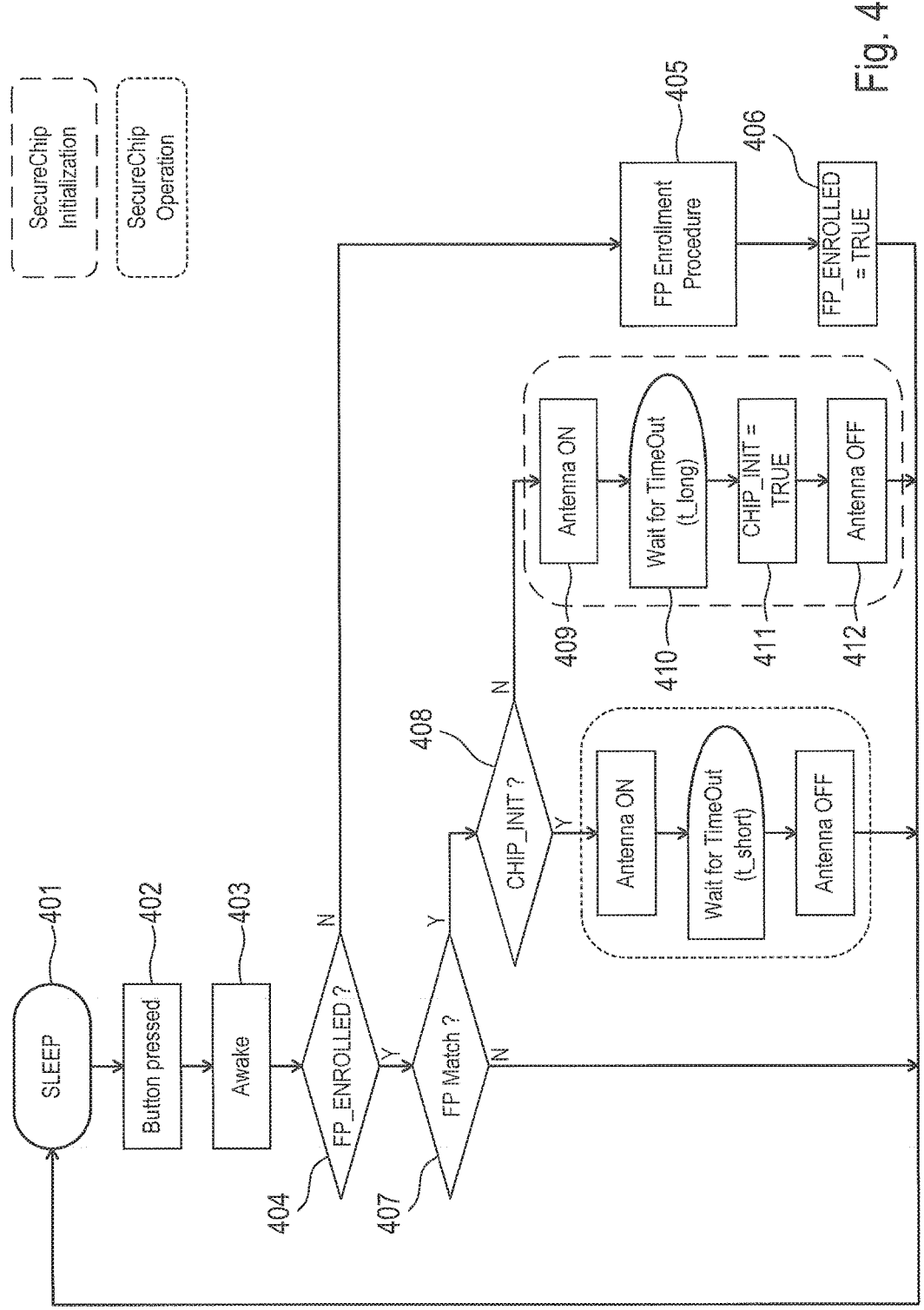

FIG. 4 is a flow chart of an alternative initialization procedure for a document 100. Analogous to the method depicted in FIG. 3, the document 100 is first switched 403 from a sleep state 401 out of the sleep state to an active state, for instance by actuating a push-button 402.

Then there is a check of whether the document 100 has already been registered 404 (FP_ENROLLED?) to a user by storing an identification feature. If this is not the case, the registration procedure is then initiated 405 and runs analogously to step 310 in FIG. 3. Then, following successful registration, a marker is set that the document 100 was registered 406 (FP_ENROLLED=TRUE) to a user. The document 100 then returns to the sleep state 401. If the document 100 is actuated again 402, 403, there is then another check of whether the document 100 is registered to a user.

If it is now determined that an identification feature of a user has already been stored, it is then checked whether the identification feature of the current user of the document 100 matches the identification feature that was stored in the storage means 112 of the document 100 during the registration 407 (FP_MATCH?). If this is not the case, the procedure is discontinued and the document returns to the sleep state 401. However, if the identification feature of the current user of the document 100 matches the identification feature stored in the storage means 112, there is then a check of whether the first processor 104 of the document 100 was already initialized 408 (CHIP_INIT?).

If this is not the case, the antenna 106 of the document 100 is actuated 409 and kept actuated 410 for a period of time t_long. During this period of time, the cryptoprocessor 104 of the document 100 may be set up. As soon as the period of time t_long has elapsed and the cryptoprocessor 104 is appropriately set up, a marker is set that indicates that the cryptoprocessor 104 has been successfully initialized (CHIP_INIT=TRUE). Then the antenna 106 is again deactivated 412 and the document 100 returns to the sleep mode 401.

The further operation of the document 100 after a user has been registered and the cryptoprocessor 104 has been configured runs analogously with the method steps 313, 314, and 315 that were described with reference to FIG. 3.

Due to the check of the identity of the user of the document 100 who undertakes the configuration of the cryptoprocessor 104, an additional security step may be realized by the initialization method depicted in FIG. 4, since only the person to whom the document 100 was registered may change the functionality of the document 100.

REFERENCE LIST

100 Document
102 Reading device
104 Cryptoprocessor
106 Antenna
108 Microprocessor circuit
110 Fingerprint sensor
112 Storage means
114 Actuator
116 Energy source
118 Cryptographic circuit
120 Antenna
122 Protected memory
124 Recess

The invention claimed is:

1. A document with sensor means, at least one antenna, a first processor, a second processor, a first storage means, a second storage means, and a switch,
wherein the first processor is designed to communicate with an external reading device via the antenna;
wherein the switch is designed to switch the antenna between a stable first state, in which communication between the first processor and the external reading device is prevented, and an unstable second state, in which communication between the first processor and the external reading device is possible, wherein in the first state the antenna is completely decoupled from the first processor by the switch;
wherein the sensor means are designed to detect a first identification feature of a user of the document; and
wherein the second processor is connected to the sensor means and the first storage means, wherein the second processor is designed to compare the first identification feature to a second identification feature that is stored in the first storage means, and wherein the second processor is furthermore designed to switch the switch to the second state when the first identification feature and the second identification feature match,
wherein the second processor is designed to keep the switch in the second state for a pre-defined period of time after determining that the first identification feature and the second identification feature match,
wherein the first processor includes the second storage means having a protected memory configured to store at least one attribute, and wherein the first processor is configured to transmit to the external reading device via the antenna the at least one attribute solely after a successful check of a cryptographic access condition.

2. The document according to claim 1, wherein the identification feature is a biometric feature of the user.

3. The document according to claim 1, wherein the document furthermore comprises a battery, wherein the battery is designed to supply the second processor and the sensor means with energy.

4. The document according to claim 3, wherein the document furthermore comprises an actuation element, wherein the actuation element is designed to turn on an energy supply for the second processor and the sensor means when activated.

5. The document according to claim 1, wherein the document furthermore comprises a contact interface, wherein the contact interface is designed to supply the second processor and the sensor means with energy.

6. The document according to claim 1, wherein the identification feature is a fingerprint.

7. The document according to claim 1, wherein a body of the document has at least one rendering of a visual identification feature of the user of the document.

8. The document according to claim 1, wherein a body of the document is constructed in multiple layers, wherein the layers comprise paper and/or plastic, wherein a recess for receiving the sensor means is provided in the body.

9. The document according to claim 1, wherein the antenna is designed to convert electromagnetic radiation received from the external reading device into electrical energy, wherein the antenna is furthermore designed to supply the first processor with electrical energy when the switch is in the second state.

10. The document according to claim 9, wherein the antenna is furthermore designed to charge with electrical energy, when the switch is in the second state, a battery that is designed to supply the second processor with energy.

11. A method for initializing a document according to claim 1, the method comprising:
Switching the antenna to the second state;
Configuring the first processor using the external reading device;
Switching the antenna to the first state;
Detecting a first identification feature of the user of the document using the sensor means;
Storing the detected identification feature in the first storage means by the second processor as a second identification feature.

12. A method for initializing a document according to claim 1, the method comprising:
Detecting an identification feature of the user of the document using the sensor means;
Storing the detected identification feature in the first storage means by the second processor as a second identification feature;
Detecting a first identification feature of the user of the document using the sensor means;
Comparing the first identification feature to the second identification feature using the second processor;
Switching the switch to the second state using the second processor if there is conformity between the first identification feature and the second identification feature;
Configuring the first processor using the external reading device;
Switching the antenna to the first state.

13. An access control system that comprises at least one document according to claim 1, the external reading device, and one access control device, wherein the external reading device is designed to communicate with the document, wherein the document, following successful checking of the cryptographic access condition, is configured to transmit the at least one attribute to the external reading device, wherein the reading device is designed to compare the at least one attribute received by the document to a reference attribute, wherein the external reading device is furthermore designed to switch the access control device to a release state if the at least one attribute matches the reference attribute.

14. The document of claim 1, wherein the cryptographic access condition comprises at least one of:
a challenge-response process;
a request of a PIN; or
a request of an authorization certificate.

15. The document according to claim 1, wherein the second processor is further designed to keep the switch in the second state after the sensor means no longer detects the first identification feature of the user of the document.

16. The document according to claim 1, wherein the pre-defined period of time is adjustable.

* * * * *